July 28, 1964    S. JEFFERSON ETAL    3,142,759
MONORAIL PACKAGE IRRADIATION PLANT
Filed Jan. 16, 1961      2 Sheets-Sheet 1
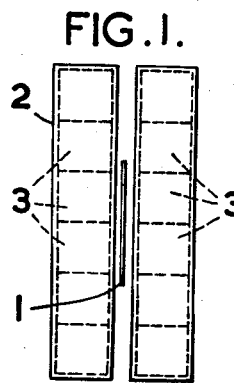
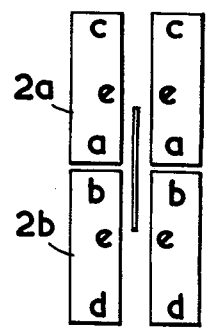
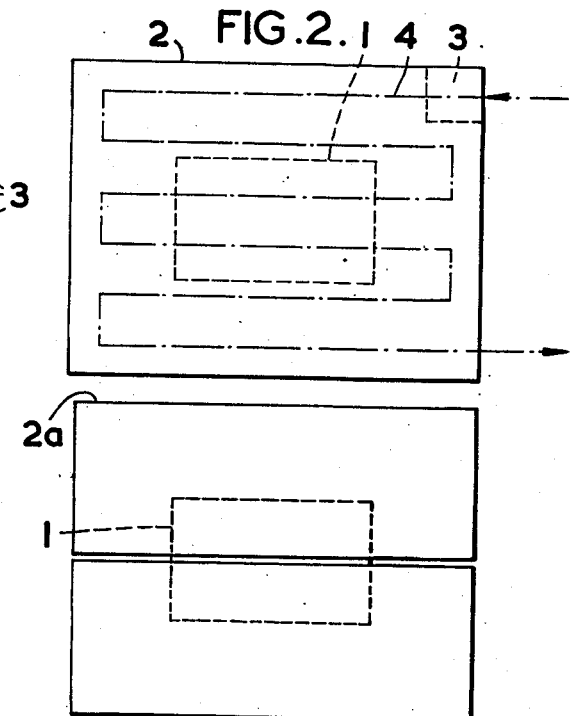
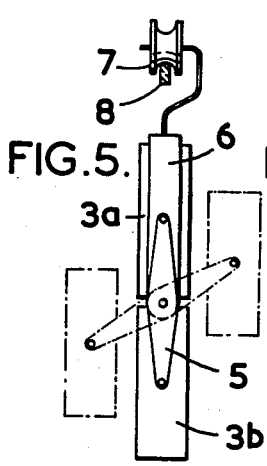
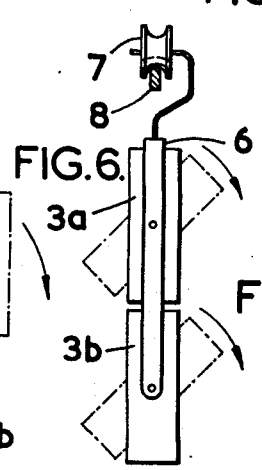
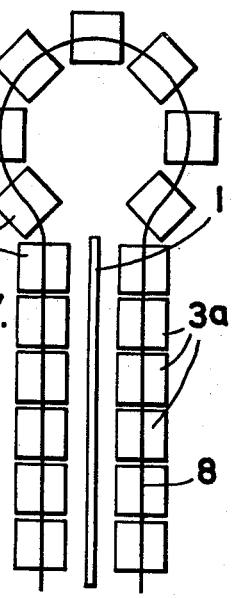

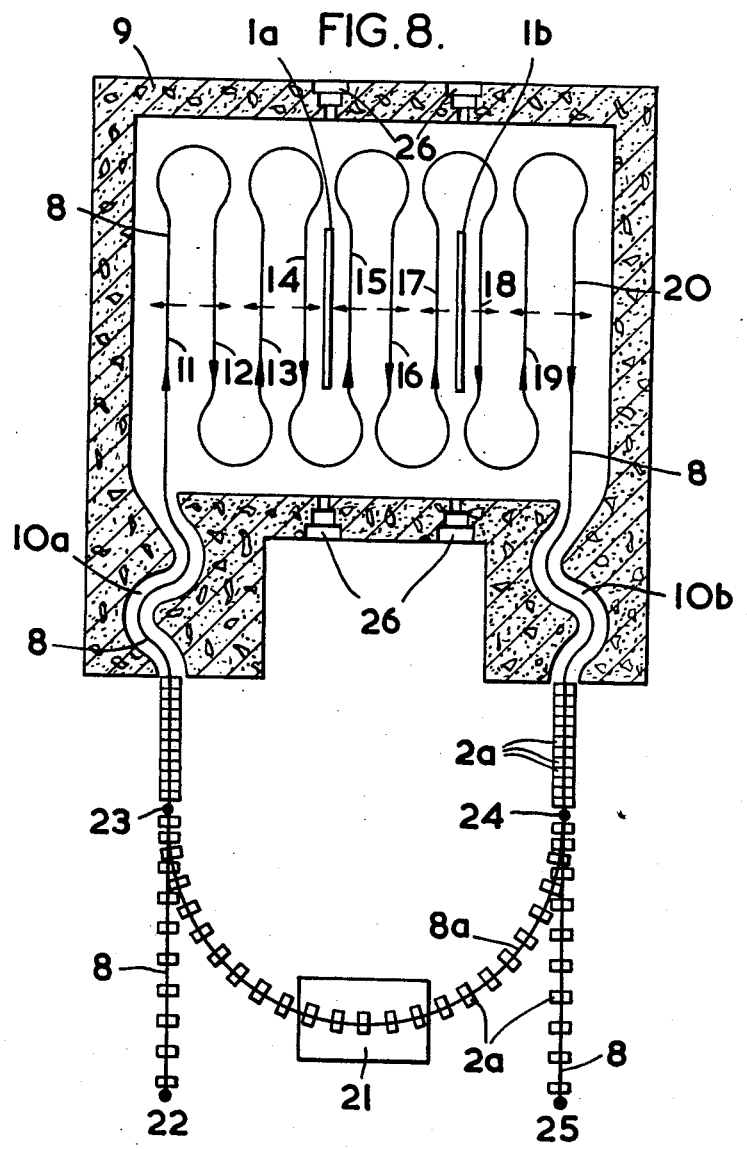

United States Patent Office 3,142,759
Patented July 28, 1964

3,142,759
MONORAIL PACKAGE IRRADIATION PLANT
Sidney Jefferson, Abingdon, and Frank Rogers, Wantage, England, assignors to United Kingdom Atomic Energy Authority, London, England
Filed Jan. 16, 1961, Ser. No. 83,054
Claims priority, application Great Britain Jan. 20, 1960
6 Claims. (Cl. 250—106)

This invention relates to package irradiation systems in which a powerful source of atomic radiation, such as gamma radiation from cobalt 60, is used to process articles or substances placed in the packages. The usual process is one of sterilization.

Known systems such as those described in the Proceedings of the International Conference on the Peaceful Uses of Atomic Energy at Geneva, 1955, vol 15, pp. 258–264, and in Nuclear Energy Engineer, December 1959, pp. 594–5 employ a plate source of irradiation and irradiate arrays of continuously moving packages within slab-like zones on each face of the source. In the former known system the plate source is arranged to give a uniform field in the vertical direction and the zones are of approximately the same height as the plate. In this system a considerable loss of radiation occurs at the upper and lower edges of the plate and in the latter system this is avoided and the maximum use made of the $4\pi$ solid angle of radiation by employing a plate source of substantially uniform radiation and by traversing the packages at successive levels within the zones extending both vertically and horizontally well beyond the edges of the source.

A mechanism of the known kind for traversing packages backwards and forwards at successive levels first on one side of a plate like source and then on the other can tend to become complicated, particularly if, in order to ensure maximum utilization of the solid angle of radiation no or little space is provided between the packages.

Limitations are also imposed on the design of the mechanism due to the fact that it is subjected to the radiation, for example, lubrication is a difficulty, and since the whole must be enclosed in a massive and costly biological shield, space is at a premium. Also maintenance within the shield is not possible during normal operation with the source in position.

An object of the present invention is to provide a relatively simple system for conveying packages past a sheet like source of radiation in such a manner as to give each package a substantially uniform dose and at the same time utilizing most of the $4\pi$ solid angle of radiation from said source.

To this end, according to the invention, in a system for irradiating packages comprising a plate like source of radiation and means for passing packages across the faces of the source within zones extending beyond the area of the source, the zone on each face is divided along a median into two zones and means are provided for re-orientating each zone in relation to the median line such that those inner edges on the median line become the outer edges and vice versa.

The zones may be re-orientated by reversing each zone individually or by transferring one zone to the position of the other zone without reversal.

In order to enable the nature of the invention to be more readily understood reference is directed by way of example to the accompanying drawings in which:

FIG. 1 is a diagrammatic end elevation of a known irradiation system.

FIG. 2 is a side elevation of FIG. 1.

FIG. 3 is a view similar to FIG. 1 illustrating the principle of the present invention.

FIG. 4 is a side elevation of FIG. 3.

FIG. 5 is a view similar to FIG. 3 illustrating one practical method of carrying out the principle of the invention.

FIG. 6 is a view similar to FIG. 5 of a modification.

FIG. 7 is a diagrammatic plan view of a part of a monorail system for carrying out the invention, and FIG. 8 is a diagrammatic sectional plan view of a complete irradiation cell embodying an example of the invention.

Referring to FIGS. 1 and 2 a known irradiation system comprises a sheet like source 1 between slab-like irradiation zones 2 within which packages 3 are moved in a series of horizontal passes as indicated by the zig-zag line 4 in FIG. 2. The packages are turned when transferred from one zone to the other so as to present an opposite face to the source. A mechanism for effecting this movement tends to become complex, particularly if the packages are to be contiguous.

FIGURES 3 and 4 are views similar to FIGS. 1 and 2 but illustrating the principle of the present invention. Each zone 2 is divided into upper and lower zones $2a$ and $2b$ respectively. Packages or multiple package containers $3a$ and $3b$ of the same depth as the zones $2a$ and $2b$ and of any suitable length are arranged to make one horizontal pass so that the lower edges $a$ of the top containers $3a$ and the upper edges $b$ of the bottom containers $3b$ receive the maximum radiation from the median line of the source, and then the containers are re-orientated before making another horizontal pass such that the aforesaid contiguous edges $a$ and $b$ occupy the uppermost and lowermost positions $c$ and $d$ where the radiation is a minimum.

To ensure a uniform dosage the height of the zones $2a$ and $2b$ should each be about the same height as the source 1 and the polar diagram of the source should be such that the doses received in any one pass by the mid-point $e$ are each approximately equal to half the sum of the doses received at $a$ and $c$ or $b$ and $d$.

A mechanism for effecting the re-orientation of the zones may comprise separate conveyors for the upper and lower passes and may either comprise means for transferring the containers from one conveyor to the other after each pass or for turning the containers upside down between passes. Alternatively each pass may be effected in a section of a single conveyor such that the containers make successive upper and lower passes.

It is preferred, however, for mechanical simplicity to employ a simple monorail suspension conveyor to move an associated pair of upper and lower containers past the source together. Two arrangements for reversing the containers are shown in FIG. 5 and FIG. 6 each of which may be regarded as an end view of one zone 2.

In FIG. 5 the containers $3a$ and $3b$ (each of which may contain an array of packages) are each pivotally mounted at each end on the end of a double armed lever 5 which in turn is pivotally mounted at its centre point on a hanger 6 depending from a wheel 7 which runs on a monorail 8. Normally a catch holds the lever 5 in a vertical position but by releasing the catch the position of the two containers can be reversed, as they are shown in progress of being, in broken lines.

In the alternative arrangement shown in FIG. 6 each container $3a$, $3b$ is pivotally mounted directly on the hanger 6 and may be turned upside down by rotation about the pivot. It will be noticed that in the arrangement of FIG. 5 the containers remain facing the same way whereas in FIG. 6 they are reversed.

The monorail 8 is arranged to enter a shielded radiation cell and make a number of passes across the faces of one or more sheet-like sources, being turned-about at the ends of the source. To enable the rail to make small radius bends the containers are made short in the direction of travel and may be substantially square in plan as shown in FIG. 7. Means, well known in the conveyor art, are provided to increase, as shown, the spacing of the containers as they negotiate the bends.

This ability to negotiate small radius bends also enables the containers to enter the massive wall of an irradiation cell through a radiation trap in the form of a labyrinthine passage.

A feature of the invention is that the minimum of mechanical contrivances need be installed within the cell; in fact the in-cell conveyor system may consist only of a serpentine layour of monorail and simple drive mechanism. Mechanism for operating the container reversal gear as shown for example in FIG. 5 or FIG. 6 may be arranged outside the cell. Using a single source this involves two entrances and two exits. It is preferred, however, to have only one entrance and one exit and such an arrangement employing two sources is shown in FIG. 8.

The overhead monorail 8 enters the radiation cell 9 through a sinuous passage 10a and leaves through a similar passage 10b. Within the cell are two sheet-like radiation sources 1a and 1b and the monorail makes a plurality of passes 11–20 parallel with the sources. After three preliminary passes 11 to 13, passes 14 and 15 are made in close proximity to the source 1a and it will be noticed from the direction of the transverse arrows on the monorail that containers making passes 14 and 15 will be irradiated on the same side on each of these passes. By arranging the rail to make a central pass 16 before the passes 17 and 18 close to source 1b, it will be seen by studying the transverse arrows that the opposite sides of the containers are irradiated by source 1b. Two more passes 19 and 20 at increasing distances from the source are made before the rail leaves the cell through labyrinth 10b.

Thus one circuit through the cell of containers suspended in the manner shown for example in FIG. 5 and FIG. 6 will give both sides of the container substantially equal doses of irradiation but the doses will not be uniform in the vertical plane, most of the dose being concetrated along the horizontal median line where the upper and lower containers abut. If, however, the containers are switched to a return rail 8a and reversed, as indicated in FIG. 5 or FIG. 6, at a station 21 and then sent on a second circuit of the cell, then, assuming the relative heights of the source and containers and the vertical polar diagram are substantially as described with reference to FIG. 3 the total dose in the vertical plane is substantially equalised.

During the linear irradiation passes the containers are arranged as close together as possible but as hereinbefore stated they are arranged to be separated slightly when traversing the bends. In order to operate a continuous, as distinct from a batch-wise process, the containers may be fed in at the receiving point 22 at twice the normal spacing and intercalated with partially irradiated containers, also at twice normal spacing, on the return rail 8a at a suitable switch point 23. At switch point 24 those alternate containers which have made one circuit only of the cell are automatically switched to the return rail 8a whereas those which have made two circuits are switched to the delivery point 25.

The driving mechanism may conviently comprise wheels on vertical axis at the centre of curvature of each bend, the wheels being arranged above the monorail and having depending fingers which "pick-up" each suspended unit and drive it around the bend at a fixed spacing. Along the linear passes 11–20 the units may be driven at minimum spacing by chains passing around sprockets at each end. Outside the cell the monorail may be inclined downwards from point 22 to the labyrinth 10a and again downwards form the labyrinth 10b to the point 25 to provide a gravity feed. In this case the return rail 8a will have an upward incline and the units may be driven up the incline by a wheel or chain mechanism.

Reversal of the containers at the station 21 may be done automatically or manually. It will be appreciated that the mechanisms shown in FIG. 5 or FIG. 6 may be dispensed with and for example simple static containers may be used, the packages in the upper and lower containers being interchanged manually or by a suitable automatic or semi-automatic mechanism installed at the station.

The source 1a and 1b may consist of vertical racks containing tiers of horizontal strings of cobalt 60 pencils loaded into the racks through vertically arranged series of holes 26 normally filled by stepped bungs (not shown). Loading and unloading may be effected from and into coffins in a manner similar to that employed in loading and unloading the fuel elements in the British Experimental Reactor which is fully described in British patent specification No. 799,134. Also, it is preferred to suspend the source on cables and to provide a water-filled pit in the floor of the cell into which the whole source can be lowered while maintenance is carried out within the cell, suitable safety locks being installed to ensure that nobody could be inside the cell with the source in the raised position.

As examples of possible orders of magnitude for the apparatus shown in FIG. 8, the sources may each be about 8 ft. long and 5 ft. high and consist of forty 8 ft. long horizontal tubes arranged one above the other and containing strings of 6 in. long cobalt 60 pencils. The strength of the individual pencils along a string may be varied so as to adjust the polar diagram in the horizontal plane and the relative strengths of the tiers adjusted to provide the required vertical polar diagram. The dimensions of the slabs 2 for such a source would be about 18 ft. long and 10 ft. high. Thus the containers 2a and 2b may be each 5 ft. high and, say, 1 ft. square in plan. A convenient package size would be 1 ft. cube thus enabling five packages to be stacked in each container.

We claim:

1. Irradiation apparatus comprising a plate like source of gamma radiation, a plurality of containers for containing packages to be irradiated, the height of said containers each being substantially the same as the height of said source, means supporting said containers in groups of two in columnar arrangement, means for passing said groups of containers over at least one face of said source in such a manner that the inner edges of the containers forming said groups move parallel and in close proximity to a medial line dividing said source into substantially equal upper and lower portions, and means permitting re-orientation of the containers forming said groups such that the original inner edges of the containers become the outer edges so as to provide for a substantially uniform radiation dosage for said containers.

2. Irradiation apparatus comprising: a plate like source of gamma radiation; a plurality of units to be irradiated, said units to be irradiated being arranged in pairs in a columnar arrangement; means for passing a columnar arrangement of said units over at least one face of said source in such a manner that the medial line of said column passes parallel and in close proximity to a medial line dividing said source into substantially equal upper and lower portions; said columnar arrangement of units being of a height substantially twice the height of said plate like source so as to utilize a substantial portion of the solid angle of radiation from said source; and means for re-orienting said units forming said columnar arrangement such that the original inner edges of said units become the outer edges relative to said medial line of said source, thus providing for a substantially uniform radiation dosage for said units.

3. Apparatus as set forth in claim 2 wherein said means for re-orienting the units comprises means for reversing each unit individually relative to the source about its own horizontal medial line.

4. Apparatus as set forth in claim 2 wherein said means for re-orienting the units comprises means for transferring one unit to the position of another unit without reversal of the units about their respective individual medial lines.

5. Apparatus for irradiating packages comprising a plate like source of gamma radiation, a mono rail conveyor system for conveying packages in columnar form across the faces of the source within gamma radiation zones extending beyond the area of the source such that the medial line of the columnar form passes parallel and in close proximity to the medial line of said source, each column of packages being divided into an upper radiation receiving unit and a lower radiation receiving unit of equal height and of a height substantially equal to the height of said source, and means for re-orientating each unit in relation to the said medial line by reversing the unit individually relative to the source about its own horizontal medial line such that the inner edges of the units on the radiation source medial line become the outer edges relative to said radiation source medial line.

6. Apparatus for irradiating packages comprising a plate like source of gamma radiaiton, a mono rail conveyor system for conveying packages in columnar form across the faces of the source within gamma radiation zones extending beyond the area of the source such that the medial line of the columnar form passes parallel and in close proximity to the medial line of said source, each column of packages being divided into an upper radiation receiving unit and a lower radiation receiving unit of equal height and of a height substantially equal to the height of said source, and means for re-orientating each unit in relation to the position of the other unit without reversal relative to the source such that the inner edges of the units on the radiation source medial line become the outer edges relative to said radiation source medial line.

References Cited in the file of this patent

UNITED STATES PATENTS 2,489,918    Menges ---------------- Nov. 29, 1949

OTHER REFERENCES

Sterilization of Medical Supplies with Gamma Radiation, by Brownell et al., from Proc. of the International Conference on the Peaceful Uses of Atomic Energy, United Nations Publication, New York, 1956; pp. 258–264, vol. 15.